April 2, 1968     B. I. WHITLOCK     3,376,074

DYNAMIC WHEEL BALANCER UNIT

Filed Aug. 15, 1966     2 Sheets-Sheet 1

INVENTOR
BEAUFORD I. WHITLOCK

ATTORNEY

INVENTOR
BEAUFORD I. WHITLOCK

Richards, Harris & Hubbard
ATTORNEY

United States Patent Office 3,376,074
Patented Apr. 2, 1968

3,376,074
DYNAMIC WHEEL BALANCER UNIT
Beauford I. Whitlock, Stafford, Kans., assignor to AWB Manufacturing, Inc., Stafford, Kans., a corporation of Kansas
Filed Aug. 15, 1966, Ser. No. 572,456
7 Claims. (Cl. 301—5)

This invention relates to dynamic wheel balancers and more particularly, but not by way of limitation, to dynamic wheel balancer units which may be easily adapted to and installed upon motor vehicle wheels.

Dynamic wheel balancers have been utilized during the past several years and typically have taken the form of an annular casing enclosing a plurality of balls or other balancing elements, together with a quantity of oil or other hydraulic fluid. The balancer is concentrically mounted on a wheel, such as commonly found in motor vehicles. With the balancer concentrically mounted on a wheel, the balls position themselves on rotation so as to be substantially diametrically opposed to the mass tending to cause imbalance of the wheels. The effect of the positioning of the balls is thus to move the center of mass of the wheel into coincidence with the center of rotation and thus eliminate vibration and uneven operation of the wheels.

Dynamic wheel balancers have been mounted on motor vehicle wheels in various ways. In some installations, a specially constructed bracket is affixed to the wheel and the wheel balancer mounted within the bracket.

In other instances, the wheel balancing means is mounted within a hub cap. The present invention provides an inexpensive wheel balancer unit which can be quickly installed on many existing wheels without the use of specially constructed brackets and clips.

The invention may be generally described as a dynamic wheel balancer unit for mounting on a rim provided with a recess and a groove proximate the outer edge of the rim which is suitable for accommodating an O-ring type retainer. A dynamic balancer ring is provided which is so dimensioned that it may be inserted into the recess in the rim, and upon insertion abut the rim along a portion of the axially inwardly oriented periphery of the ring. A resilient O-ring type retainer is provided which is so dimensioned that it may be inserted into the recess and accommodated within the groove in the rim so that it contacts the ring along a portion of the axially outwardly oriented periphery of the ring.

Figure 1:
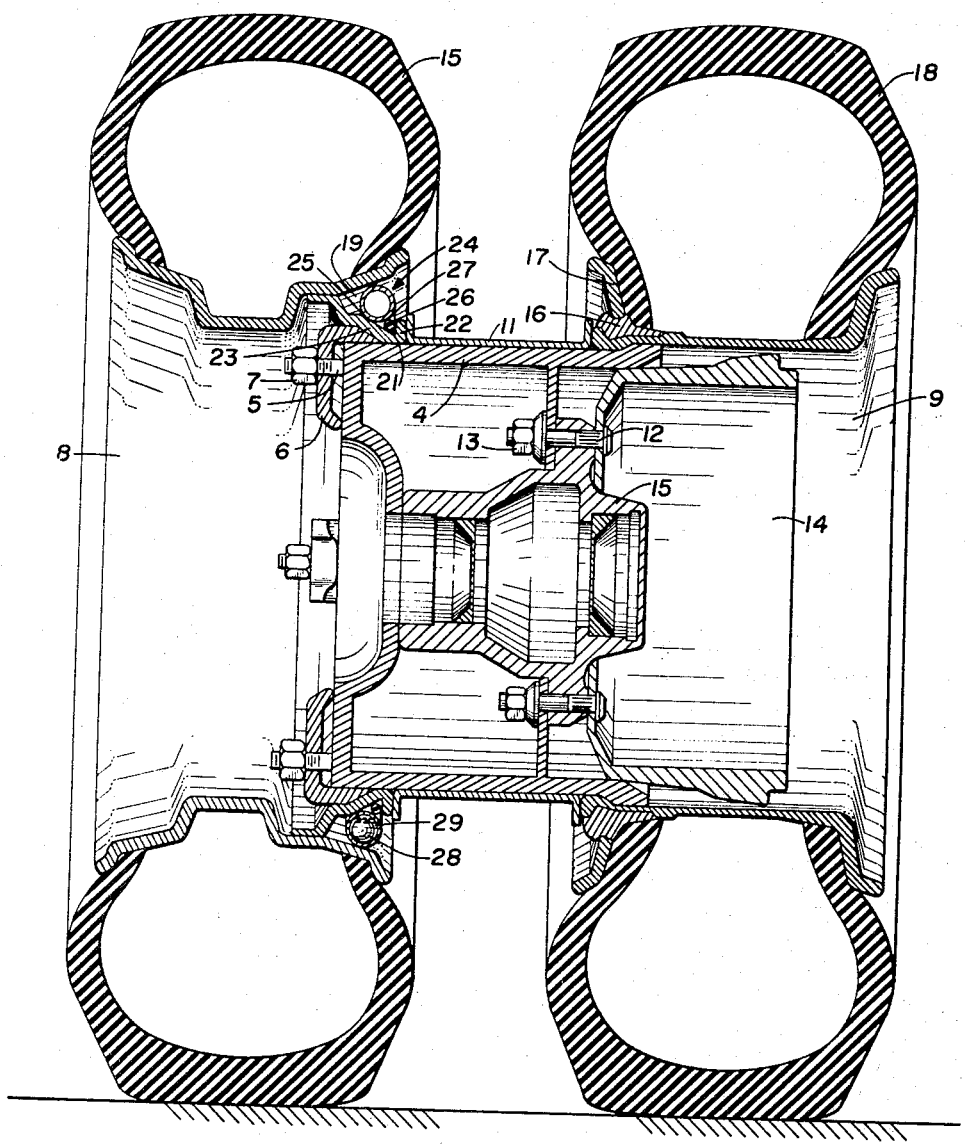
Figure 2:
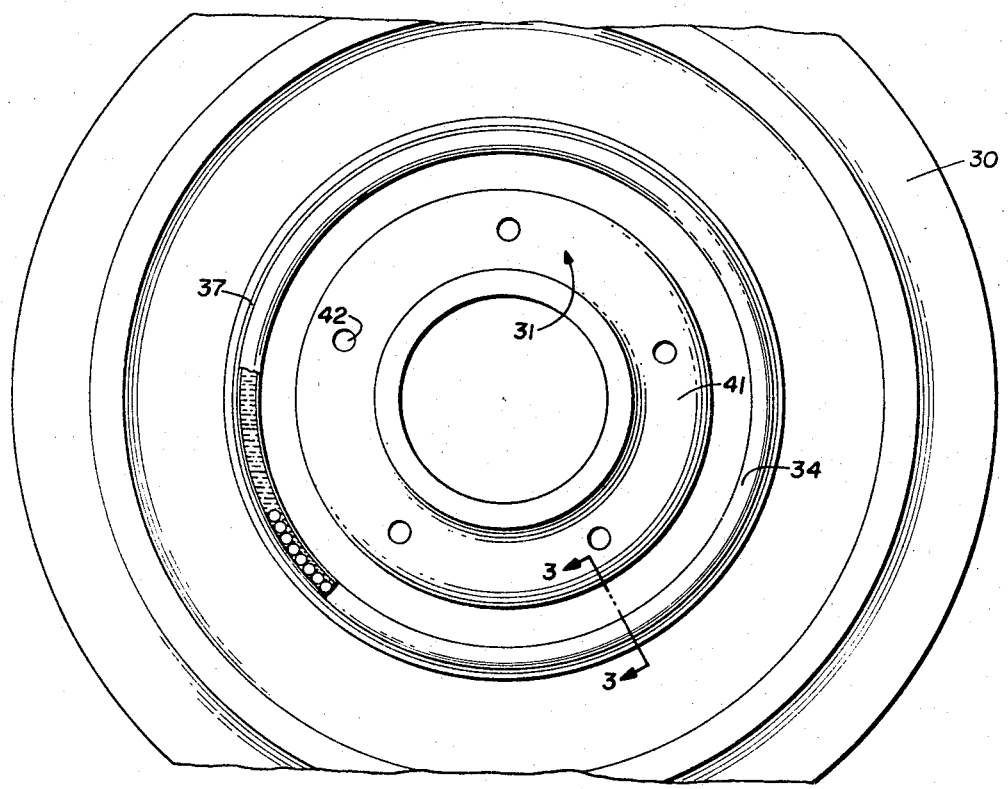
Figure 3:
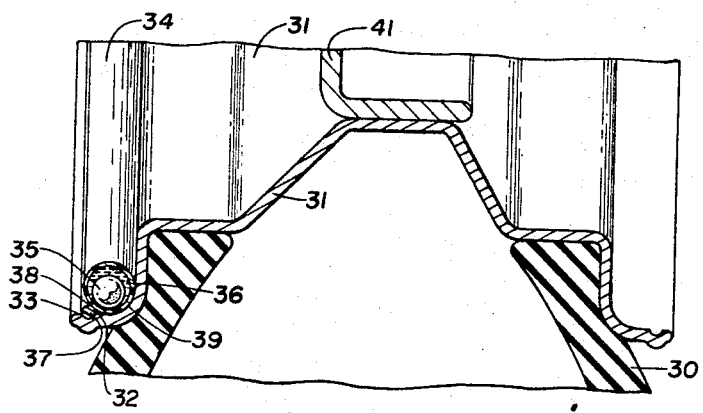

To be more specific, reference is made to the drawings, in which:

FIGURE 1 is a cross-sectional elevational view of a dual tired unit employing one embodiment of the present invention, FIGURE 2 is an elevational view of a motor vehicle tire employing yet another embodiment of the present invention, and FIGURE 3 is a cross-sectional view taken along lines 3—3 of FIGURE 2.

With reference to FIGURE 1, a conventional wheel assembly includes an annular wheel 4 from which project a plurality of studs 5. Studs 5 receive a plurality of clamps 6 and nuts 7, which serve to secure outer rim 8 and inner rim 9 to wheel 4, rims 8 and 9 being maintained in a spaced relationship by a spacer band 11. Wheel 4 carries a plurality of bolts 12 which receive nuts 13 for mounting of brake drum 14 and bearing hub 15, within which the axle of the vehicle will be carried in a conventional manner. Rim 8 has mounted thereon a conventional tire 15, and rim 9, of different construction, by use of a retainer bead 16 and mounting ring 17 carries a second tire 18.

Rim 8 is a conventional rim, such as that manufactured by Firestone Tire & Rubber Company, and is provided at its axial inward face with a diverging recess 19 and a groove 21 formed by lip 22 on leg or rim mounting flange 23. Accommodated within recess 19 is a circular dynamic wheel balancer ring 24. Ring 24 is dimensioned to contact leg 23 along its axially inwardly oriented periphery as indicated by numeral 25. Ring 24 is retained in recess 19 by a resilient O-ring type retainer 26 which in a relaxed position has an inner diameter less than the inner diameter of groove 21 so that it may be stretched and inserted over lip 22 where it will assume the position illustrated in FIGURE 1. Retainer ring 26, as illustrated in FIGURE 1, contacts balancer ring 24 and along a portion of its radially outwardly oriented periphery as indicated by reference numeral 27. Retainer ring 24 carries a plurality of weight means such as balls 28 and a damping fluid 29, which during operation as explained above, assume a position opposed to the mass tending to cause imbalance of the wheels. The effect of the ball 28 is to move the center of mass of the wheel into coincidence with the center of rotation for eliminating vibration and uneven operation.

The principle of operation of the balancer ring 24 is well understood, and those skilled in the art will realize that various type weight means and damping fluids may be used.

During operation, retainer ring 26 will serve to retain balancer ring 24 within the recess 19. Balancer ring 29 is installed by removal of rim 8 in a conventional manner, followed by insertion of balancer ring 29 and retainer ring 26 in recess 19.

The present invention has application to single rim wheels as well as multiple rim wheels and reference is here made to FIGURES 2 and 3 where such an application is illustrated. In FIGURE 2, a rim 31 is provided with a dynamic wheel balancer recess 32 formed by an axially extending terminal rim lip flange and a groove 33 proximate the axially outwardly portion of recess 32. Accommodated within recess 32 is a circular balancer ring 34 which carries conventional balls 35 and damping fluid 36. Balls 35 and damping fluid 36 operate in the manner described above.

Within the groove 33 is accommodated an O-ring type retainer 37 which abuts the axially outwardly portion of the periphery of the ring 35 as indicated by numeral 38. Abutment along portion 38 cooperates with the abutment between the axially inwardly portion of the periphery of the ring 34 and rim 31 as indicated by numeral 39 to secure balancer ring 34 in place. Rim 31, conventionally carries a fixed center plate 41 provided with a plurality of apertures 42 through which lug bolts may be received and receives a tire 30 in a conventional fashion.

While the particular balancer rings illustrated are circular in cross section, it will be appreciated that they may be oval, triangular in cross section, or assume various other shapes. Also, while the retainer illustrated is a resilient, O-ring type seal circular in cross section, it will be appreciated that it as well may assume various forms. While rather specific terms have been used to describe one embodiment of the invention, they are not intended nor should they be construed as a limitation on the invention, as shown by the claims. For example, the weight means may take the form of shot or other type particulate material which can freely move within the balancer ring to assume a position diametrically opposed to the mass tending to cause imbalance. Various damping fluids may be used, such as transmission fluid, brake fluid, glycerin, ethylene glycol or other type fluid having a specific gravity less than that of the weight means.

What is claimed is:
1. A dynamic balancing wheel assembly, comprising:
 (a) a rim having a ring accommodating axially facing circumferentially extending recess, said recess being formed in part by an axially extending rim flange, said rim flange also being provided with a radially opening groove along one axial edge of said recess;
 (b) a dynamic balancer ring positioned within said recess in abutment with said rim along a portion of the inwardly oriented portion of the ring;
 (c) a resilient O-ring type retainer accommodated within said groove in abutment with a portion of the outwardly oriented periphery of the ring.

2. The assembly of claim 1, wherein said O-ring type retainer contacts said balancer ring along a radially inwardly oriented portion of its axially outwardly oriented periphery.

3. The assembly of claim 1, wherein said O-ring type retainer contacts said ring along a radially outwardly oriented portion of its axially outwardly oriented periphery.

4. The assembly of claim 1, wherein said ring is substantially circular in cross section.

5. The assembly of claim 4, wherein said O-ring type retainer is substantially circular in cross section.

6. The assembly of claim 6, wherein said rim flange is a radially inwardly and axially extending rim mounting flange.

7. The assembly of claim 6, wherein said rim flange comprises an axially extending terminal lip flange.

References Cited

UNITED STATES PATENTS

| | | | |
|---|---|---|---|
| 2,226,511 | 12/1940 | Hollerith | 301—37 |
| 2,237,501 | 4/1941 | Purvis | 301—5 |
| 2,336,920 | 12/1943 | Beaman | 301—5 |
| 3,006,690 | 10/1961 | Pierce | 301—5 |
| 3,080,771 | 3/1963 | Baldwin | 301—5 X |
| 3,314,726 | 4/1967 | Rehnborg | 301—5 |

RICHARD J. JOHNSON, *Primary Examiner.*